United States Patent
Dykstra et al.

(10) Patent No.: US 9,727,633 B1
(45) Date of Patent: Aug. 8, 2017

(54) CENTROID DETECTION FOR CLUSTERING

(71) Applicant: Amazon Technologies, Inc., Seattle, WA (US)

(72) Inventors: Aaron James Dykstra, Federal Way, WA (US); Siyang Dai, Seattle, WA (US); Diwakar Chakravarthy, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 15/048,904

(22) Filed: Feb. 19, 2016

Related U.S. Application Data

(62) Division of application No. 13/949,526, filed on Jul. 24, 2013, now Pat. No. 9,280,593.

(51) Int. Cl.
  *G06F 17/30* (2006.01)
(52) U.S. Cl.
  CPC .............................. *G06F 17/30598* (2013.01)
(58) Field of Classification Search
  CPC ........... G06F 17/30598; G06F 17/3087; G06F 17/30; G06F 17/30867
  USPC .................................................. 707/600–899
  See application file for complete search history.

(56) References Cited

U.S. PATENT DOCUMENTS 6,584,433 B1  6/2003  Zhang et al.
2003/0123737 A1*  7/2003  Mojsilovic ........ G06F 17/30247
  382/224

OTHER PUBLICATIONS

U.S. Appl. No. 13/949,526 , "Non-Final Office Action", Jul. 13, 2015, 9 pages.
U.S. Appl. No. 13/949,526 , "Notice of Allowance", Nov. 12, 2015, 8 pages.
The ACM Digital Library, Search Results for "(Abstract: dataset and Abstract: centroid and Abstract: adjust)", Search conducted Nov. 13, 2015, 1 page.
IEEE Xplore Digital Library, Search Results for "(dataset centroid data cluster point location adjust delta)", Search conducted Nov. 3, 2015, 2 pages.

* cited by examiner

*Primary Examiner* — Isaac M Woo
(74) *Attorney, Agent, or Firm* — Kilpatrick Townsend & Stockton LLP

(57) ABSTRACT

A method of categorizing data points is described which, when combined with a clustering algorithm, provides groupings of data points that have an improved confidence interval. The method can be used to find an optimal number of groupings for a dataset, which in turn allows a user to categorize a group of data points for processing. In some examples, a dataset containing a number of data points may be accessed. Additionally, in some aspects, groupings of data points within the dataset may be grouped based at least in part on similarities between the data. Further, a number of groupings of data points may be adjusted so that the distance between the data points within one or more groupings of data points may fit within a confidence level.

20 Claims, 9 Drawing Sheets

CENTROID DETECTION FOR CLUSTERING

CROSS-REFERENCE TO RELATED APPLICATIONS

This application is a Divisional of U.S. patent application Ser. No. 13/949,526, filed Jul. 24, 2013, issued to U.S. Pat. No. 9,280,593 on Mar. 8, 2016, and entitled "CENTROID DETECTION FOR CLUSTERING," which is incorporated herein by reference in its entirety.

BACKGROUND

With the growth of data being made available to businesses, data mining has become an especially important part of any business strategy. In order for data mining to be effective, it may be appropriate to be able to correctly categorize data points within a dataset. Clustering analysis plays an important role in this categorization as it allows an analyst to group similar data points and find patterns. This type of analysis may be used in a wide range of fields, including machine learning, pattern recognition, image analysis, information retrieval, bioinformatics, and targeted advertising. However, one problem with cluster analysis is that it is difficult to determine the optimum number of clusters to be used for the data. Optimization of a centroid-based clustering algorithm is known to be NP hard, meaning that any increase in accuracy comes with a significant increase in computing cost.

BRIEF DESCRIPTION OF THE DRAWINGS

Various embodiments in accordance with the present disclosure will be described with reference to the drawings, in which.

DETAILED DESCRIPTION

Figure 1:
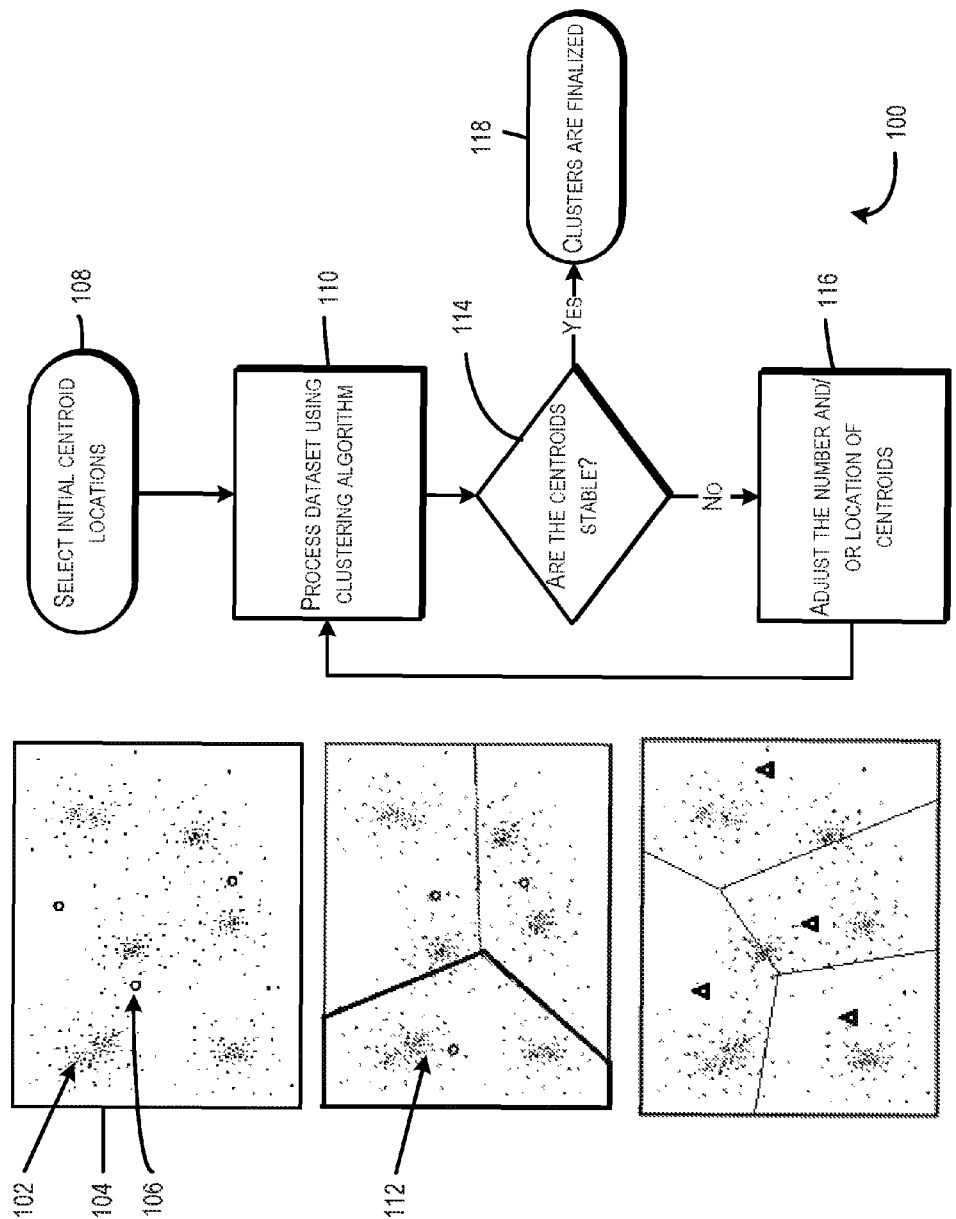
FIG. 1 shows an example flow diagram illustrating a process for categorizing data points of a dataset described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, providing techniques for categorizing data points. In at least one embodiment, a number of centroids may be placed throughout a dataset. In this example, after the centroids are initially distributed, a clustering process may be employed to cluster the data points in the dataset by similarity in the data points. Additionally, similarity between data points may be represented by the proximity of those points. In this same embodiment, once these data points are each clustered, the process will determine whether any of the centroids are unstable. If instability is found, the number of centroids may be adjusted and the clustering process may be repeated. When this adjustment is made, new centroid locations may be selected randomly or by using an optimization algorithm. Although old centroid locations may also be used, using new centroid locations may help avoid local maximums. By adjusting the number of centroids in this way, a user employing this process may be able to create groupings of data points with improved accuracy.

Data points in a dataset may be used to represent a number of things. For example, in one embodiment, a dataset may be a consumer database stored within a computer storage device. Each data point in this example database may represent a consumer, with various axes used to represent information such as income, age, political views, geographic location or purchase history. Using income and age as example axes, a business may find that a product is more suitable to high-income, high-age consumers than it is to other consumers. It may therefore be a waste of resources to direct advertisements at other groups of consumers. As a way of furthering this example, a business may choose to target one advertisement to a specific cluster of consumers and a second advertisement to another cluster of consumers. Similarly, a business may choose to send an advertisement to members of a cluster because at least one other member of the cluster has made a purchase.

In some embodiments of the present disclosure, an initial number of centroids may be determined which should be used in the clustering process. In one embodiment, the initial number of centroids may be randomly determined. In another embodiment, the initial number of centroids may be a set number or may be proportional to the number of data points in the dataset. These centroids are then distributed throughout the dataset. Although one example may involve a random distribution of the centroids throughout the dataset, the method is also compatible with processes that provide more optimal starting locations for the centroids.

Although some embodiments of this disclosure may involve the use of a centroid-based clustering process to cluster data points, it is envisioned that a variety of clustering processes could be used, including but not limited to, a hierarchical clustering process, a distribution-based clustering process or a density-based clustering process.

In an embodiment of the clustering process, a method might assign each data point to the centroid that is closest to it. In some examples, this may be done by using vector analysis to determine the distance from each data point in the dataset to each centroid. However, other methods of determining distance or assigning data points to centroids may also be effective. Once data points are assigned to their respective centroids, the set of data points belonging to a single centroid is known as a cluster or a grouping. A center point is assigned to each cluster using various techniques, which may, in some examples, be meta-clustering techniques. In some examples of such a technique, a center point may be the geometrical center of the cluster. In some examples of the technique, it may be appropriate to find the mean average along each data axis in the dataset and assign the center point to that mean average. In some examples of the technique, a center point can be assigned to a median value along each axis point. In some examples of the technique, a center point can be limited to the data point within the dataset which is closest to the center of the cluster. In some examples of the technique, it may be appropriate to use a combination of various methods of assigning center points. In one embodiment, once a center point is found for the cluster, the centroid of the cluster may be moved to that center point. This clustering process might be repeated a number of times so that the centroids of each cluster will converge on the optimal centroid locations. The number of times that a clustering process should be repeated may be determined by the optimization level that a user is attempting to achieve. In one embodiment, this optimization level may be a degree of desired accuracy or a confidence interval. In another embodiment, the optimization level may weigh a degree of accuracy against the processing power, or other factors, needed to reach that degree of accuracy.

Several methods may be employed to determine whether centroids are stable. In one embodiment of the disclosure, the movement of the centroid is measured against a delta amount. If the movement of the centroid is less than that delta amount, then that centroid may be considered stable. The movement of the centroid that is measured might be a measure of the length of the entire movement of the centroid during the clustering process, or it might just be a measure of the length of the movement of the centroid during the last iteration of the clustering process. In one embodiment of the disclosure, the delta amount would be set prior to beginning the embodied process. Where the delta amount is set prior to beginning the embodied process, the delta amount may be set based at least in part on a desired level of accuracy or a confidence level. Although this delta amount may be an estimate, its value may also be derived from a mathematical formula performed on the dataset and/or based at least in part on attributes of specific data points within the dataset. In another embodiment of the present disclosure, the delta amount may be adjusted during the embodied process in order to provide a higher degree of accuracy. Although one embodiment of this disclosure involves measuring the distance traveled by a centroid, other factors may be used. In some embodiments of the disclosure, prior centroid locations are compared to current ones. In these embodiments, where the current centroid locations are not similar to the prior centroid locations, this may indicate that there are local maximums, and hence instability. In some embodiments of the disclosure, the stability of a centroid may be determined by analyzing the change in composition of a cluster. A cluster that has lost, gained or exchanged a large number of data points within the dataset may not be stable. In that embodiment, it is also possible to determine the stability of a centroid by comparing the change in composition of a cluster against a delta amount. Although this disclosure focuses on the movement of the centroids and the composition of a dataset cluster, other methods of determining stability of a cluster should be recognized as equivalent.

In some embodiments of the disclosure, the number of centroids may need to be adjusted when there are centroids that are not stable. The number of centroids may be adjusted either up or down when at least one centroid is unstable or when a proportion of the centroids used are unstable. In some embodiments of the disclosure, a user may wish to start with a low number of centroids and increase that number when the centroids are unstable. In other embodiments of the disclosure, the user may wish to start with a high number of centroids and decrease that number when the centroids are unstable. In either of these embodiments, the user should be able to reach a more optimal number of centroids.

In some embodiments of the present disclosure, the resulting centroid locations are finalized when the centroids are found to be stable. To be finalized, a centroid location is stored into memory in a computer storage device, returned by a software module and/or displayed to a user. In other embodiments of the present disclosure, the process may report a confidence level indicating the degree of certainty that data points are properly grouped. Once the centroid locations are finalized, actions can be performed on particular data points. In one example, these actions are based at least in part on prior actions taken regarding other data points located within the same cluster. In another example, these actions are based at least in part on attributes of, and/or actions taken by, other data points located within the same cluster.

FIG. 1 depicts an illustrative process 100 in which techniques for the categorization of data points may be implemented. These techniques are described in more detail below in connection with at least FIGS. 2-7. Returning to FIG. 1, the illustrative process 100 applies to a number of data points 102 within a dataset 104. By way of example only, the process may involve defining a number of centroids 106 that are each given initial locations 108, which can be determined either randomly or by applying an algorithm. A clustering process 110 may be used to break the data points 102 into clusters 112. When a centroid 106 is moved to the center of a cluster 112, a stability determination 114 may be made, which can be based at least in part on the length of the movement made by the centroid 106. If the stability determination 114 indicates that the centroid 106 is not stable, then an adjustment 116 may be made to the number of centroids in the dataset 104. If the stability determination 114 indicates that the centroid 106 is stable, then a finalization event 118 may occur. In some examples, this finalization event 118 may be a recording of the locations of each centroid 106, a preparation for display of those locations, and/or a display of those locations. In other examples, this finalization event 118 may include returning attributes specific to a particular cluster 112.

Figure 2:
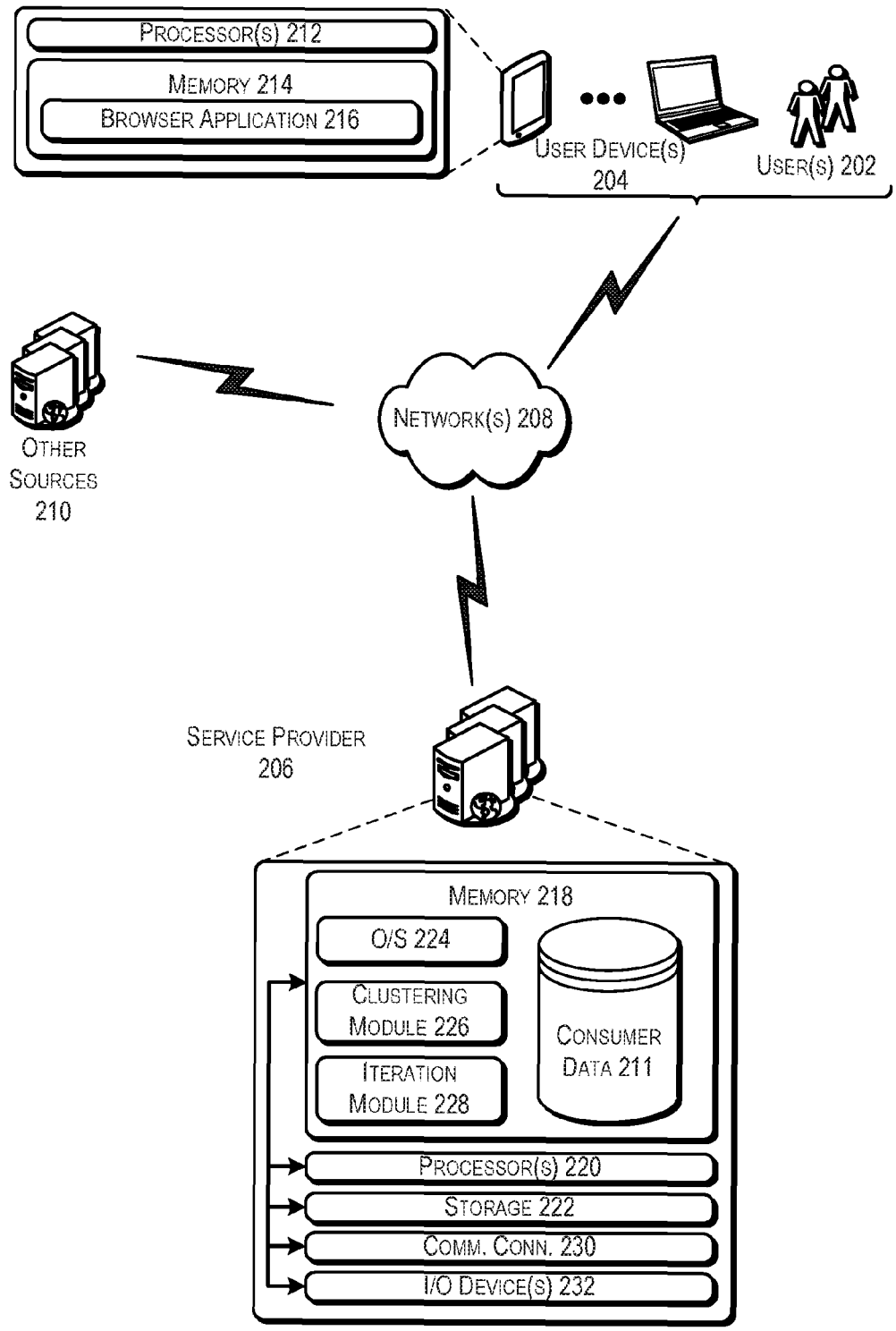
FIG. 2 illustrates an example architecture for categorizing data points of a dataset described herein that includes one or more web service computers and/or a user device connected via one or more networks, according to at least one example.

FIG. 2 depicts an illustrative example of a system or architecture 200 in which techniques for categorizing data points may be implemented. In architecture 200, one or more consumers and/or users 202 may utilize user devices 204. In some examples, the user devices 204 may be in communication with a service provider 206 via the networks 208, or via other network connections. Data specific to each user 202 can be collected when the user logs into an account, provides data (such as by filling out a survey) or makes a purchase. Alternatively, this data may be collected from the user devices 204 or provided by another source 210 (which may include a third party, a web crawler, or a database). The service provider may then store this data in a database for housing consumer data 211.

The user devices 204 may be any type of computing device such as, but not limited to, a mobile phone, a smart phone, a personal digital assistant (PDA), a laptop computer, a desktop computer, a server computer, a thin-client device, a tablet PC, etc. The user device 204 may include one or more processors 212 capable of processing user 202 data. Data collected from the user devices 204 may be collected from its memory 214. For example, data may be collected from metadata tags or cookies stored in a browser application 216.

In some examples, the networks 208 may include any one or a combination of many different types of networks, such as cable networks, the Internet, wireless networks, cellular networks, and other private and/or public networks. While the illustrated example represents the users 202 accessing the browser application 216 over the networks 208, the described techniques may equally apply in instances where the users 202 interact with a service provider computer 206 via the user device 204 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

As described briefly above, the browser application 216 may allow the users 202 to interact with a service provider computer 206, such as to store, access, and/or manage data, develop and/or deploy computer applications, and/or host web content. The one or more service provider computers 206, perhaps arranged in a cluster of servers or as a server farm, may host the browser application 216. These servers may be configured to host a website (or combination of websites) viewable via the user device 204 or a web browser accessible by a user 202. Other server architectures may also be used to host the browser application 216. The browser application 216 may be capable of handling requests from many users 202 and serving, in response, various user interfaces that can be rendered at the user device 204 such as, but not limited to, a web site. The browser application 216 can be any type of website that supports user interaction, including social networking sites, electronic retailers, informational sites, blog sites, search engine sites, news and entertainment sites, and so forth. As discussed above, the described techniques can similarly be implemented outside of the browser application 216, such as with other applications running on the user device 204.

The service provider computers 206 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers 206 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment.

In one illustrative configuration, the service provider computers 206 may include at least one memory 218 and one or more processing units (or processor(s)) 220. The processor(s) 220 may be implemented as appropriate in hardware, computer-executable instructions, firmware or combinations thereof. Computer-executable instruction or firmware implementations of the processor(s) 220 may include computer-executable or machine-executable instructions written in any suitable programming language to perform the various functions described.

The memory 218 may store program instructions that are loadable and executable on the processor(s) 220, as well as data generated during the execution of these programs. Depending on the configuration and type of service provider computers 206, the memory 218 may be volatile (such as random access memory (RAM)) and/or non-volatile (such as read-only memory (ROM), flash memory, etc.). The service provider computers 206 may also include additional storage 222, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 218 may include multiple different types of memory, such as static random access memory (SRAM), dynamic random access memory (DRAM) or ROM. Turning to the contents of the memory 218 in more detail, the memory 218 may include an operating system 224 and one or more application programs or services for implementing the features disclosed herein including at least a module for clustering 226 and a module for iteration 228.

The memory 218 and the additional storage 222, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device 204 or the service provider computers 206. The service provider computers 206 may also contain communications connection(s) 230 that allow the service provider computers 206 to communicate with a stored database, another computing device or server, user terminals, and/or other devices on the networks 208. The service provider computers 206 may also include input/output (I/O) device(s) and/or ports 232, such as for enabling connection with a keyboard, a mouse, a pen, a voice input device, a touch input device, a display, speakers, a printer, etc.

Turning to the contents of the memory 218 in more detail, the memory 218 may include an operating system 224, a database containing consumer data 211 and the one or more application programs or services for implementing the features disclosed herein including a clustering module 226 and an iteration module 228.

In some aspects, the clustering module 226 may be configured to categorize or cluster the data contained in the database of consumer data 211. For example, when data is collected from the user 202, the clustering module 226 will determine to which cluster that user 202 belongs. The service provider 206 may then be able to provide services targeted to that user 202, such as targeted advertisements. In some embodiments of the current disclosure, centroid locations are initially randomly assigned. In other embodiments of the current disclosure, centroid locations are initially assigned based on an optimization algorithm. In order to avoid local maximums and local minimums, it may also be appropriate to assign initial centroid locations so that they have not been used before or are outside of the vicinity of an "old" centroid location. In one embodiment of the clustering module 226, the module might assign each data point to the centroid that is closest to it. In some examples of this embodiment, the module may do this by using vector analysis to determine the distance from each data point in the dataset to each centroid. However, other methods of determining distance or assigning data points to centroids may also be effective. Some embodiments of the clustering module 226 may assign data points to clusters based on boundaries. As a further example of this type of clustering, where a dataset represents a physical location, the clustering module may assign data points (representing locations of objects in this example) to a cluster based on physical boundaries, such as a street or a river.

The clustering module 226 may be provided with the number of clusters that are to be generated, or it may determine that number based at least in part on a calculation performed on the dataset. The clustering module 226 may be used to alter the accuracy of the clusters created by adjusting the number of clusters used in the calculation.

In some aspects, the iteration module 228 may be configured to improve or optimize the data clusters produced by the clustering module 226 stored in the database of consumer data 211. The iteration module 228 may call the clustering module 226 or the two may run independently. The clustering module 226 may need to be called a number of times by the iteration module 228 so that the centroids of each cluster converge on optimal centroid locations. The number of times that the clustering module 226 should be called by the iteration module 228 may be determined by the optimization level that a user is attempting to achieve. In one embodiment, this optimization level may be a degree of desired accuracy or a confidence interval. In another embodiment, the optimization level may weigh a degree of accuracy against the processing power, or other factors, needed to reach that degree of accuracy. Although this disclosure focuses on an iterative method of performing a clustering process, it is also envisioned that a recursive method of performing a clustering process is available and should at least be considered relatively equivalent. The iteration module 228 may be used to alter the accuracy of the clusters created by the clustering module 226 by adjusting the number of times that the clustering process is performed.

The iteration module 228 may also keep track of all centroid locations found by the clustering algorithm or initial centroid locations used. Each time that the clustering module 226 is called, new centroid locations may need to be selected. For some embodiments, it may be appropriate to ensure that new centroid locations are selected randomly. In some embodiments, it may be appropriate to ensure that initial centroid locations chosen by the clustering module 226 have not been previously used (in order to avoid local maximums or minimums). It may also be appropriate in these circumstances to place initial centroid locations outside of a radius surrounding previous centroid locations.

In some embodiments, it may be appropriate to limit the number of times that the clustering module 226 is called by the iteration module 228. Such a limit may be used to ensure that the process will not continue indefinitely. In some embodiments, this limit may be reached when a specific number of unique centroids have been created. In some embodiments, this limit may be set before the processing of the dataset. Where the limit is set, it may be set to a number or it may be set based at least in part on a calculation performed on the dataset. In other embodiments, the limit may be dynamic, in that it can be changed throughout the process.

Figure 3:
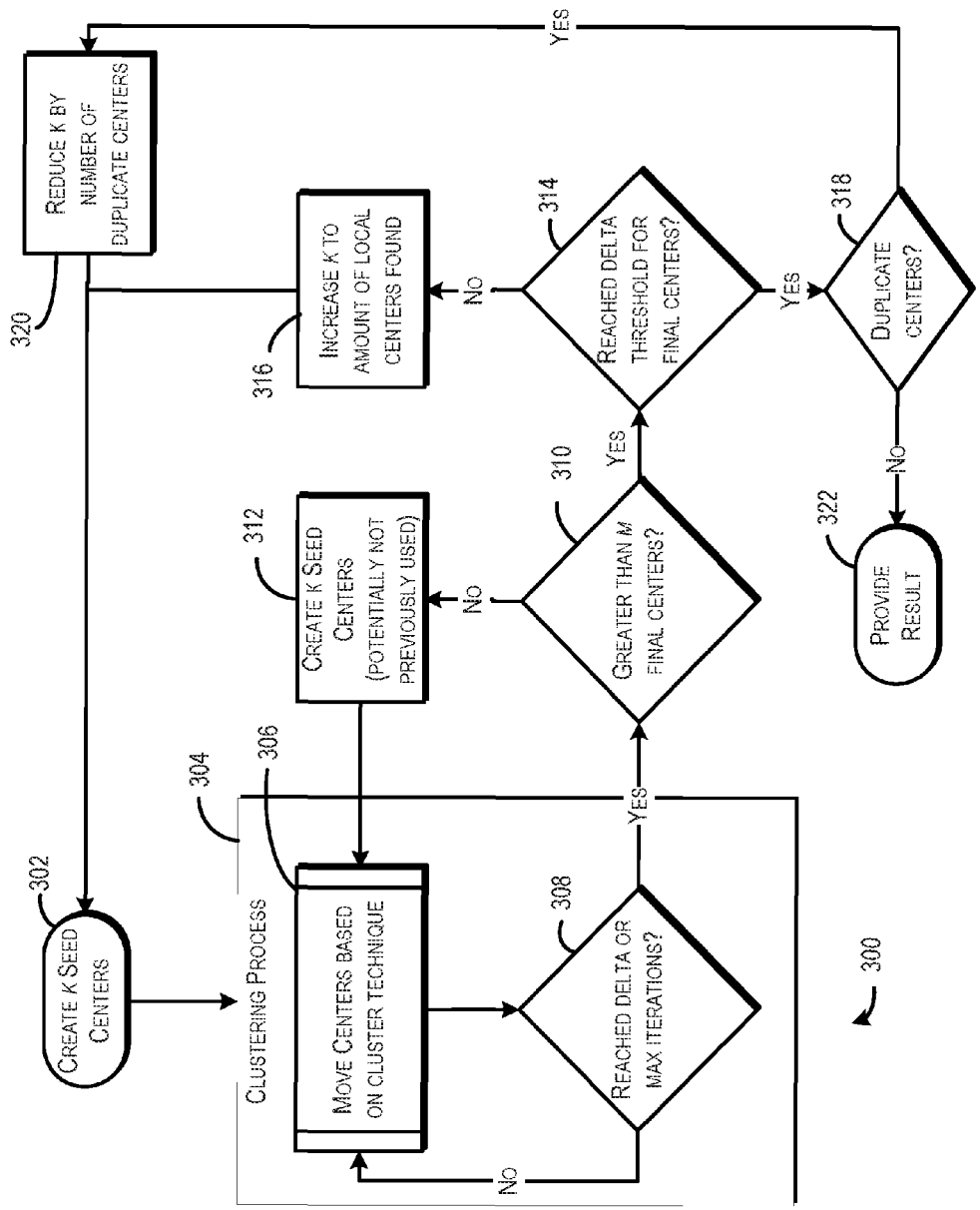
FIG. 3 illustrates another example flow diagram of a process for categorizing data points of a dataset described herein, according to at least one example.

FIG. 3 illustrates an example flow diagram showing process 300 for improving the categorization of data points. The one or more service provider computers 206 (e.g., utilizing at least one of the clustering module 226 and/or the iteration module 228) shown in FIG. 2 may perform the process 300 of FIG. 3. The process 300 may begin by creating a number k of seed centers at 302. The process may then use a clustering process at 304. The clustering process at 304 may include moving the seed centers based on a clustering technique at 306. The clustering process at 304 may then determine whether a maximum number of iterations, represented by L, or a given optimization level (represented by a movement less than a delta amount) has been reached at 308. In some embodiments, the clustering process will be repeated until a specific delta is reached. However, where local minima or local maxima exist, it is possible that the delta will not be reached within a reasonable number of iterations. For that reason, it may be appropriate to set an L such that the clustering algorithm will exit after a number of iterations. In some embodiments, the maximum number of iterations, L, may be based at least in part on a preset value. Preset values for L may be varied based on data within the dataset, such as by product categories. In some embodiments, the maximum number of iterations, L, may be based at least in part on a calculation performed on the dataset, such as a proportionality calculation. In some embodiments, the maximum number of iterations, L, may be adjusted during the clustering process 304. If the delta is not reached and the clustering process has not run at least L times, then the clustering process at 304 may be repeated. If one or more of the conditions have been met, then the process 300 may determine whether a threshold m has been reached for final centers at 310. This may involve ensuring that there are at least m number of centroids. This number m can be set in advance or it may be adjusted during the process 300. Where m is set in advance, it may be set by a user or it may be determined based at least in part on a calculation performed on the dataset. If the threshold m has not been reached for final centers, the process 300 may create k new centers at 312 and repeat the clustering process at 304. It may be appropriate to ensure that the new centers created at 312 have not been used in the past. It may also be appropriate to ensure that these new centers are outside of a given radius for each old center. This can be accomplished by selecting data point locations for which a vector distance to any old locations is greater than that radius.

If the threshold m has been reached for final centers at 310, then the process 300 may determine whether the final movement of the centers are each within a given optimization level (represented by a movement less than a delta amount) at 314. If this is not the case, then the process 300 may once again increase the number k of centers at 316 and return to 302 of the process 300. In this way, k may be adjusted by being increased. If the final movement of the centers are each within a given optimization level, then the process 300 may determine whether any of the centers are duplicates at 318. To be considered duplicates, centroids may be in the same location, or they may be within a given radius from another centroid. This radius can be predetermined, or it may be based at least in part on a calculation performed on the dataset. If centers are duplicates, then k may be reduced by the number of duplicates at 320 and the process 300 may return to 302. In this way, k may be adjusted by being decreased. If none of the centers are found to be duplicates at 318, then the process 300 may conclude at 322.

Figure 4:
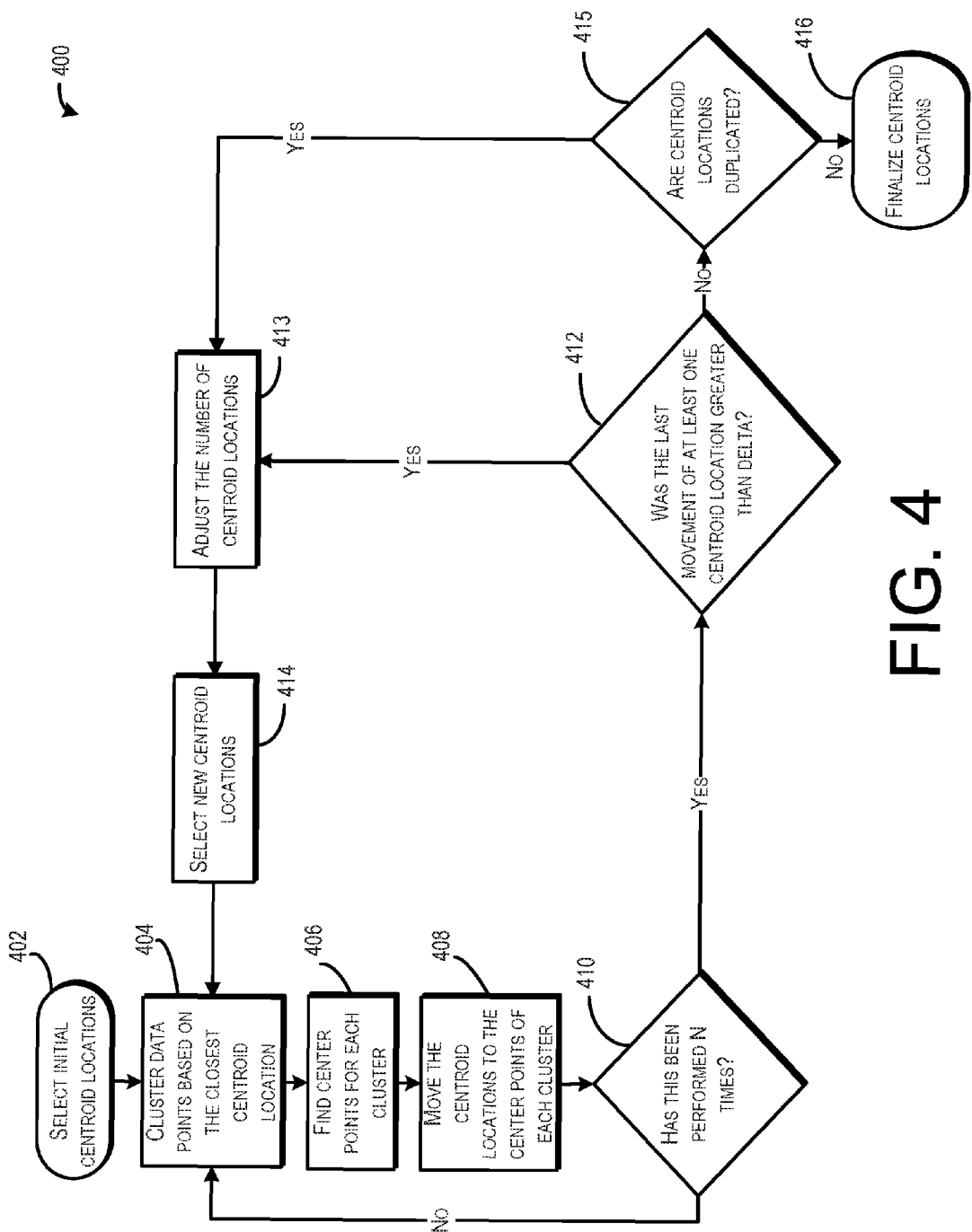
FIG. 4 illustrates another example flow diagram of a process for categorizing data points of a dataset described herein, according to at least one example.

FIG. 4 illustrates an example flow diagram showing process 400 for improving the categorization of data points. The one or more service provider computers 206 (e.g., utilizing at least one of the clustering module 226 and/or the iteration module 228) shown in FIG. 2 may perform the process 400 of FIG. 4. The process 400 may begin by including selecting initial centroid locations at 402. These locations may be selected randomly or in accordance with an algorithm for finding optimal starting locations. At 404, the process 400 may include clustering the data points based at least in part on the closest centroid location. In one embodiment, this would be done by using vector analysis to determine the distance from each data point in the dataset to each centroid and assigning each data point to the centroid closest to it. At 406, the process 400 may include finding the centers of each cluster of data points. Several methods are available for this part of the process, such as using the geometrical center of the cluster, the mean average along each data axis or using a median value along each axis. Other limitations may also be imposed, such as by limiting the center point to a data point within the cluster which is closest to the center of that cluster. At 408, the process 400 may include moving the centroid located within each cluster to the center point of that cluster. At 410, the process 400 may include returning to 404 until it has been repeated a number of times. The number of times that this should be repeated may be chosen to meet a specific optimization level or may be set at a specific value.

Once the process 400 has been repeated a number of times, it may move on to 412. At 412, the process 400 may include determining whether the centroids are now stable. In one embodiment of the disclosure, the movement of the centroid is measured against a delta amount. If the movement of the centroid is less than that delta amount, then that centroid may be considered stable. The movement of the centroid that is measured might be a measure of the length of the entire movement of the centroid during the clustering process, or it might just be a measure of the length of the movement of the centroid during the last iteration of the clustering process. In one embodiment, the delta amount would be set prior to beginning the embodied process. Where the delta amount is set prior to beginning the embodied process, the delta amount may be set based at least in part on a desired level of accuracy or a confidence level. Although this delta amount may be an estimate, it value may also be derived from a mathematical formula performed on the dataset or based at least in part on attributes of specific data points within the dataset. In another embodiment of the present disclosure, the delta amount may be adjusted during the embodied process in order to provide a higher degree of accuracy. If the process 400 at 412 determines that centroids are not stable, it may move on to 413. At 413, the process 400 may include adjusting the number of centroids within the dataset, selecting new centroid locations 414, and returning to 402 in the process 400. If the process 400 at 412 determines that centroids are stable, it may move on to 415. At 415, the process 400 may need to determine whether any of the centroid locations are duplicates. To be considered duplicates, centroids may be in the same location, or they may be within a given radius from another centroid. This radius can be predetermined, or it may be based at least in part on a calculation performed on the dataset. If duplicates are found, then it may be necessary to decrease the number of centroids at 413 and repeat the process. Otherwise, the process 400 may continue to 416. At 416, the process 400 may include finalizing the location of centroids within the dataset. This may be achieved by storing a centroid location into memory in a computer storage device, returning a value via a software module or displaying a value to a user.

Figure 5:
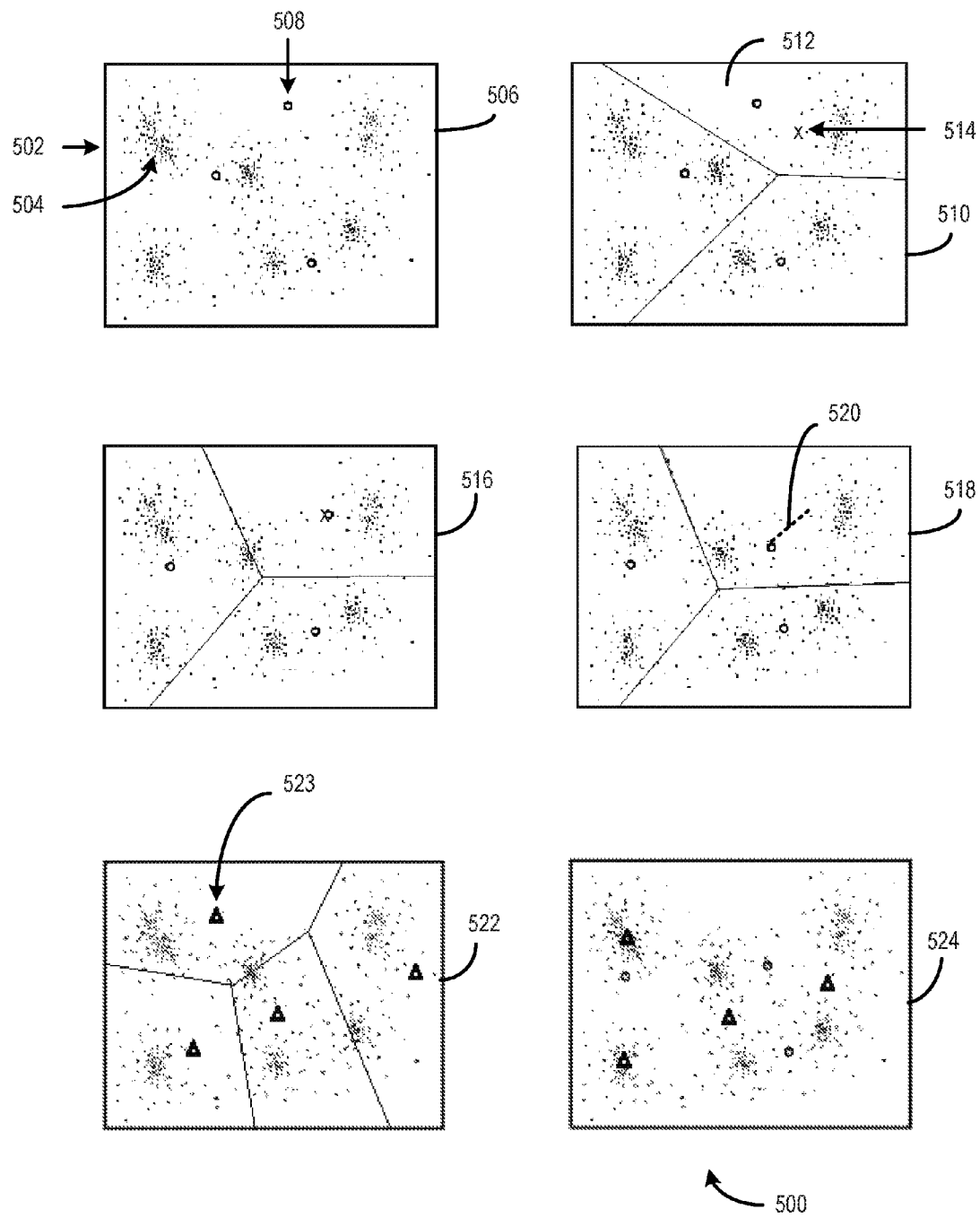
FIG. 5 illustrates an example of the operations taken within the process for categorizing data points of a dataset described herein, according to at least one example.

FIG. 5 illustrates an example of the operations 500 executed within the process for categorizing data points of a dataset described in the present disclosure. In this example, the process 100 is shown in more detail. The dataset 502 contains a number of data points 504 dispersed throughout it. The first depiction of the dataset 506 shows a centroid 508 that has initially been within the dataset 502. The second depiction of the dataset 510 shows data points 504 being placed into a cluster 512 around the centroid 508 that is closest to it. A center point 514 is determined for the cluster 512. The third depiction of the dataset 516 shows a centroid 508 being moved to a center point of a cluster 512. The fourth depiction of the dataset 518 shows another iteration of the second depiction 510 and third depiction of the dataset 516. The data points 504 in the dataset have once again been placed in a cluster 512 according to the nearest centroid 508. The centroid 508 has then been moved to the center point 514 of the cluster 512. The distance traveled 520 by the centroid 508 is then measured against a delta amount to detect stability. The fifth depiction of the dataset 522 shows the addition of a second set of centroids 523 that have been placed in new random locations. The sixth depiction of the dataset 524 shows another iteration of the second depiction 510 and third depiction of the dataset 516 with the second set of centroids 523. In this depiction, the final location of the previous centroids 508 are shown in addition to the second set of centroids 523 in order to show that there are no locations in common. This may indicate that there is a local maximum or local minimum, which may prompt a further round of clustering with new, randomly placed centroids.

Figure 6:
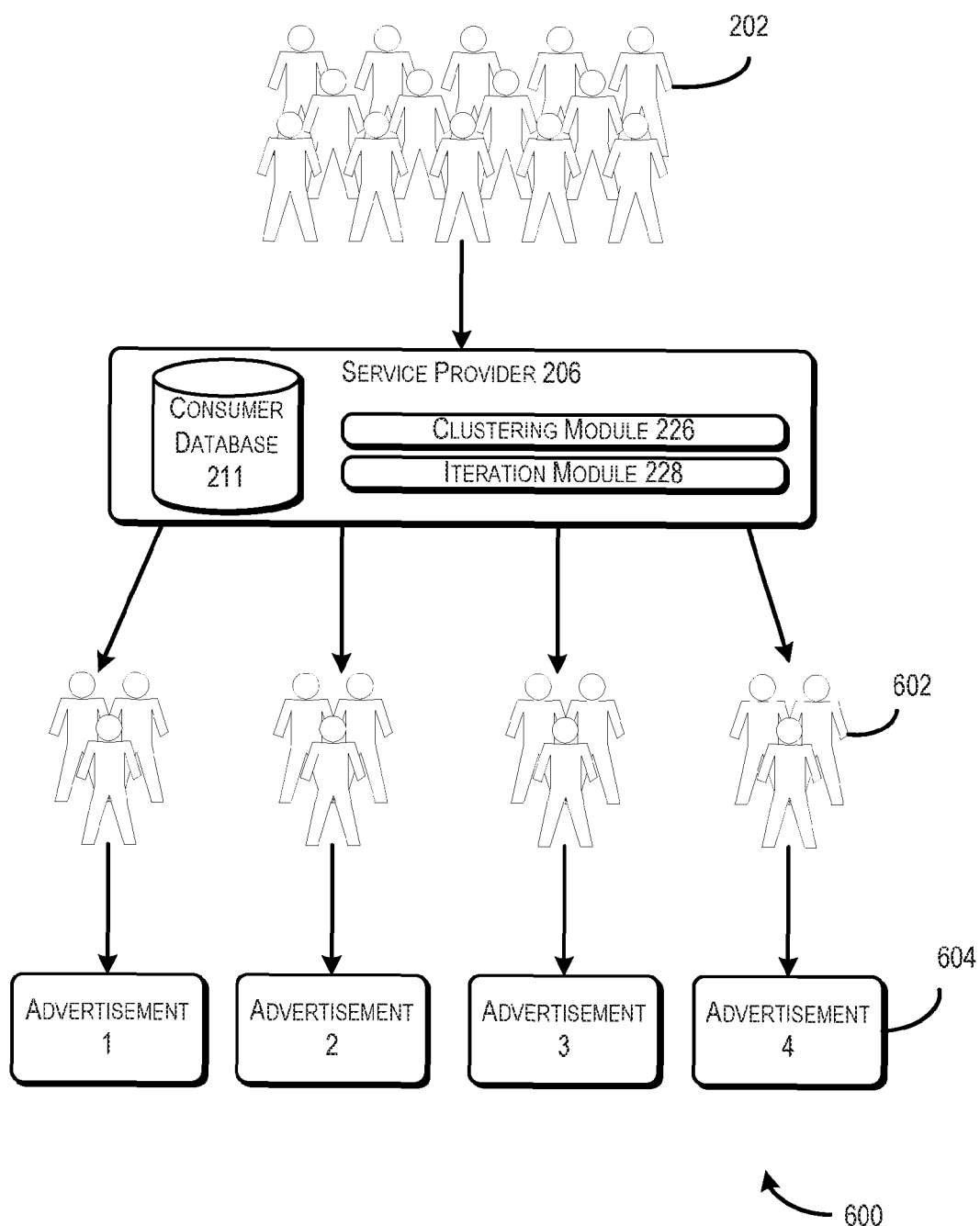
FIG. 6 illustrates an example implementation of a process for categorizing data points of a dataset described herein, according to at least one example.

FIG. 6 illustrates an example of a targeted advertisement system 600 using the categorization of data points process described herein. In this example, data is collected from users 202 and sent to a service provider 206, where it is stored in a consumer database 211. The clustering module 226 may be used to process the data when it is called by the iteration module 228. The two modules separate the users 202 into groupings/clusters 602 of consumers based at least in part on similarities between the users 202. Examples of these similarities can include similar interests and/or similar situations. An advertisement 604 may then be targeted to the users 202 included in a cluster 602. As an illustrative example of one embodiment of a targeted advertisement system 600, a website may keep track of visitors to its site via account login data. This login data may then be parsed into groups of visitors in the same age and income bracket. If the website wishes to advertise timeshares or another luxury good, the website may want to target a cluster of visitors that are older and more affluent.

In some aspects, the clustering module 226 may be configured to categorize or cluster the data contained in the database of consumer data 211. For example, when data is collected from the user 202, the clustering module 226 will determine to which cluster that user 202 belongs. The service provider 206 may then be able to provide services targeted to that user 202, such as targeted advertisements. These targeted services may be provided to the users 202 through their user devices 204 via the network 208 or the services may be provided via another method, such as by telephone or email associated with the user. The clustering module 226 may be used to alter the accuracy of the clusters created by adjusting the number of clusters used in the calculation.

In some aspects, the iteration module 228 may be configured to improve or optimize the data clusters produced by the clustering module 226 stored in the database of consumer data 211. The iteration module 228 may be used to alter the accuracy of the clusters created by adjusting the number of times that clustering procedures are performed.

Figure 7:
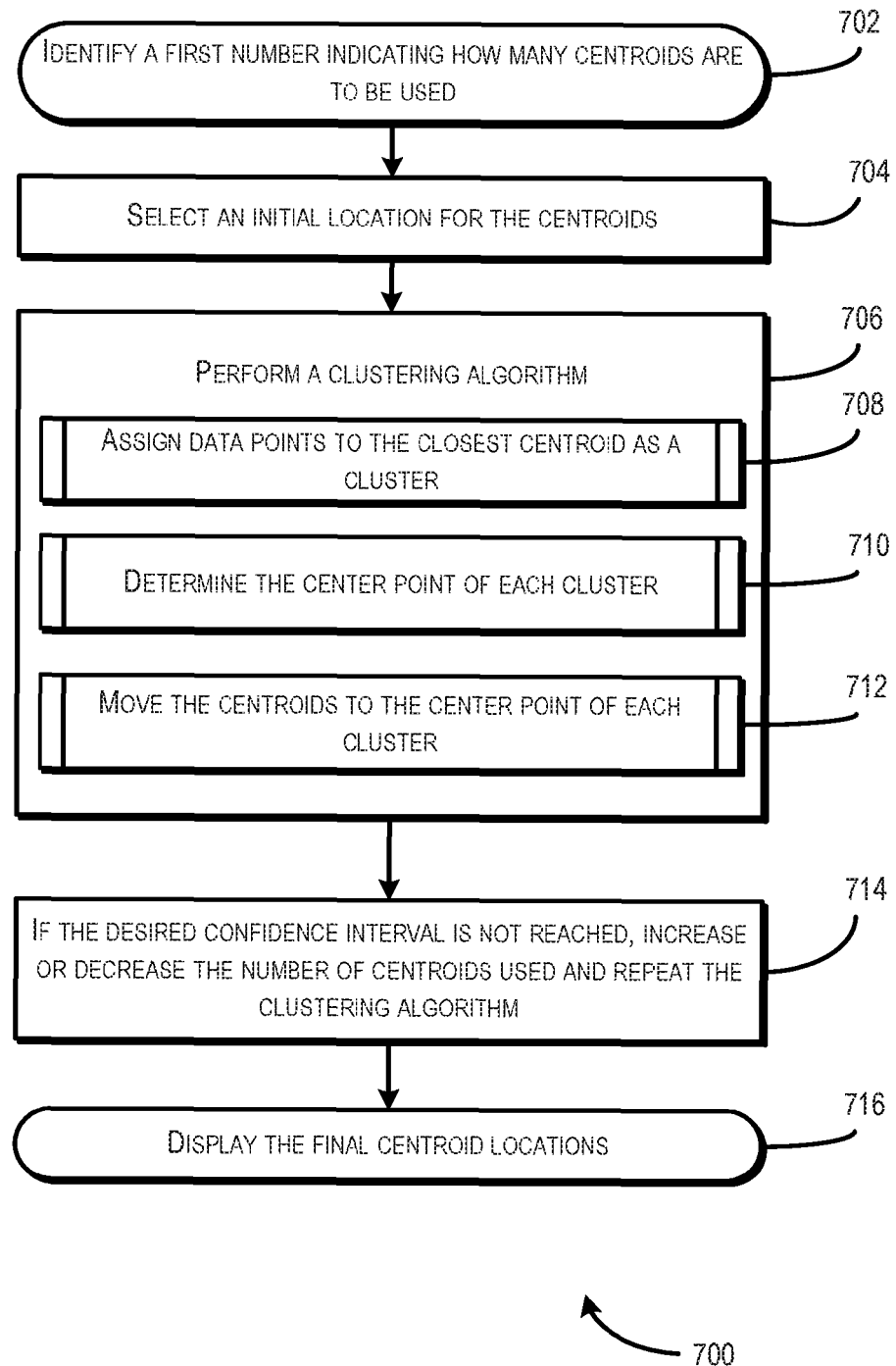
FIG. 7 illustrates another example flow diagram of a process for categorizing data points of a dataset described herein, according to at least one example.
Figure 8:
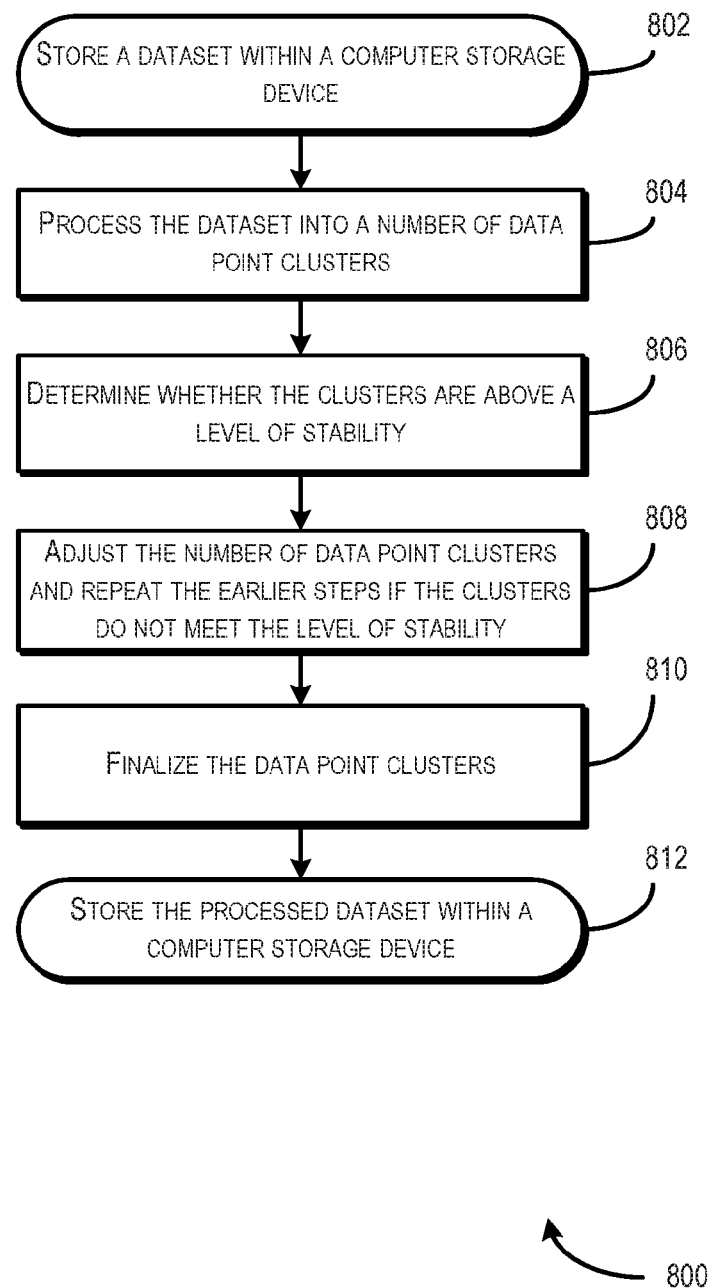
FIG. 8 illustrates another example flow diagram of a process for categorizing data points of a dataset described herein, according to at least one example.

FIGS. 7 and 8 illustrate example flow diagrams showing respective processes 700 and 800 for categorizing data points of a dataset. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any or all of the processes may be performed under the control of one or more computer systems configured with executable instructions and may be implemented as code (e.g., executable instructions, one or more computer programs or one or more applications) executing collectively on one or more processors, by hardware or combinations thereof. As noted above, the code may be stored on a computer-readable storage medium, for example, in the form of a computer program comprising a plurality of instructions executable by one or more processors. The computer-readable storage medium may be non-transitory.

In some examples, the service provider 206 shown in FIG. 2 may perform the process 700 of FIG. 7 by calling the clustering module 226 and/or the iteration module 228. At 702, the process 700 may begin by identifying a first number that indicates how many centroids are to be used in the calculation. This number may be random, preset or depend on a calculation performed on the dataset. At 704, the process 700 may select an initial (or starting) location for each centroid. This location may be selected randomly or as a result of an optimization algorithm. At 706, the process 700 may perform a clustering algorithm. Although other procedures may be used, one embodiment of the process 700 may use a centroid-based procedure such as k-means clustering. At 708, the process 700 may assign data points to the closest centroid as a cluster. At 710, the process 700 may calculate the center of each of those clusters. This calculation may involve finding mean averages, median averages, geometrical centers or any number of variations. At 712, the process 700 may move each centroid to the center of its respective cluster. At 714, the process 700 may adjust the number of centroids in the dataset after it determines whether a desired confidence level/interval has been reached. This confidence level can be preset or based on a calculation performed on the dataset. The process 700 may make the confidence determination based at least in part on the distance that each centroid has moved. At 716, the process 700 may display the final centroid locations to a user.

In some examples, the service provider 206 shown in FIG. 2 may perform the process 800 of FIG. 8 by calling the clustering module 226 and/or the iteration module 228. At 802, the process 800 may begin by storing a dataset within a computer readable storage device. At 804, the process 800 may separate the dataset into a number of data point clusters. At 806, the process 800 may determine whether the clusters of data points are stable. At 808, the process 800 may adjust the number of data point clusters in the dataset. At 810, the process 800 may finalize the data point clusters by indicating that the data point clusters are stable. At 802, the process 800 may store the final dataset values within a computer readable media.

Illustrative methods and systems for categorizing data points in a dataset are described above. Some or all of these systems and methods may, but need not, be implemented at least partially by architectures such as those shown at least in FIGS. 2-8 above.

Figure 9:
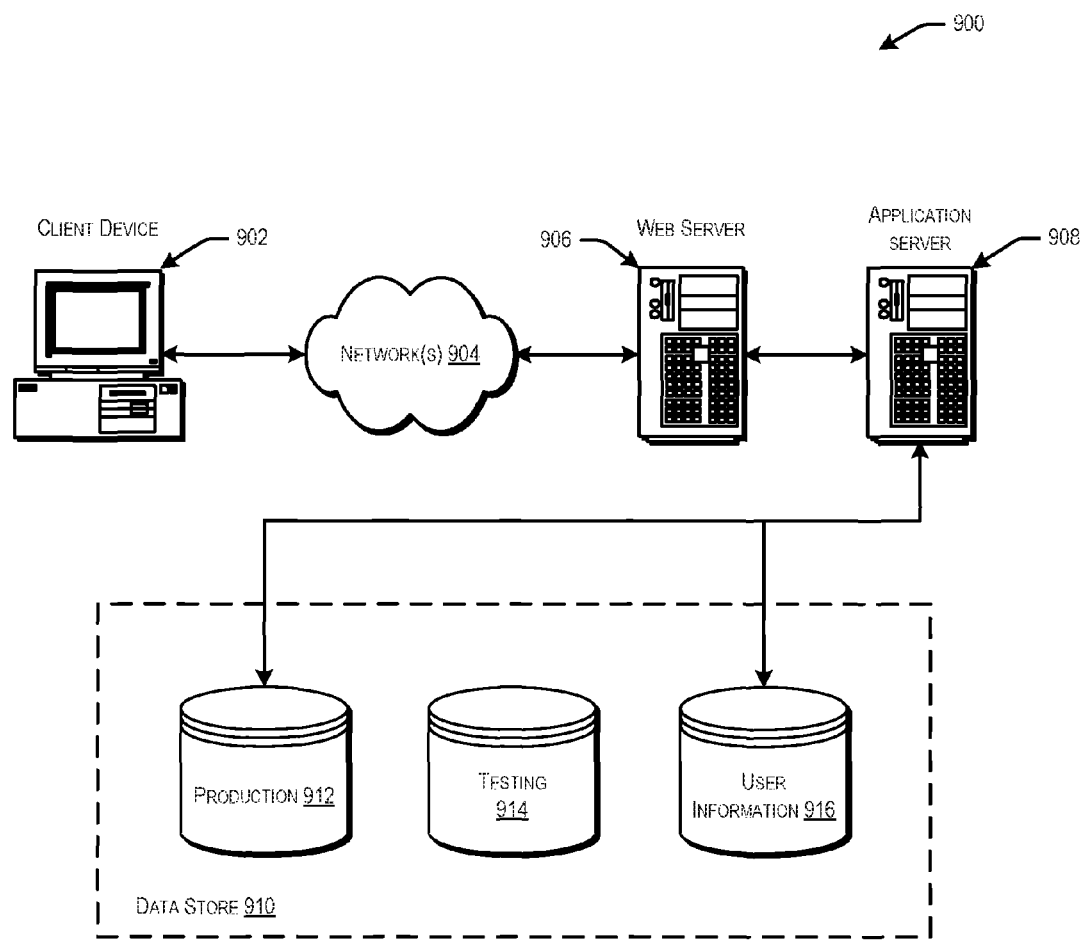
FIG. 9 illustrates an environment in which various embodiments of the secure account communication management techniques described herein can be implemented, according to at least one example.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least on clustering procedure that would be familiar to those skilled in the art for separating data points into clusters, such as a centroid-based clustering procedure, a hierarchical clustering procedure, a distribution-based clustering procedure, a density-based clustering procedure and any combination thereof.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Disjunctive language such as the phrase "at least one of X, Y or Z," unless specifically stated otherwise, is otherwise understood with the context as used in general to present that an item, term, etc., may be either X, Y or Z or any combination thereof (e.g., X, Y, and/or Z). Thus, such disjunctive language is not generally intended to, and should not, imply that certain embodiments require at least one of X, at least one of Y or at least one of Z to each be present.

Some embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    accessing a dataset containing a number of data points;
    forming, based at least in part on similarities between the data points, a first number of clusters of the data points, a cluster of the clusters containing a portion of the data points;
    determining a stability of the cluster based at least in part on a change to a center of the cluster between iterations of clustering the data points, the center determined based at least in part on the portion of the data points;
    determining that the cluster is unstable based at least in part on the change to the center of the cluster falling outside a range, the range being based at least in part on a confidence level; and
    forming, based at least in part on the cluster being unstable, a second number of modified clusters of the data points.

2. The computer-implemented method of claim 1, wherein the change to the center is based at least in part on additional data points assigned to the cluster relative to a previous iteration for clustering the data points.

3. The computer-implemented method of claim 1, wherein forming the second number of modified clusters comprises determining an adjustment to the first number of clusters.

4. The computer-implemented method of claim 3, wherein the adjustment comprises a predefined increment or a predefined decrement.

5. The computer-implemented method of claim 3, wherein the adjustment is determined based at least in part on the change to the center of the cluster, and wherein the change to the center is based at least in part on additional data points assigned to the cluster relative to a previous iteration for clustering the data points.

6. The computer-implemented method of claim 1, wherein the change to the center is based at least in part on additional data points assigned to the cluster between the iterations.

7. The computer-implemented method of claim 1, further comprising:
    providing the first number of clusters and the second number of modified clusters to a computing device for presentation at a user interface of the computing device.

8. The computer-implemented method of claim 1, further comprising:
    reporting that the cluster is unstable to a computing device.

9. The computer-implemented method of claim 1, wherein the center represents a centroid of the data points.

10. The computer-implemented method of claim 9, wherein the location of the centroid is randomly set, and wherein the portion of the data points is assigned to the cluster based at least in part on proximities of the portion of the data points to the location of the centroid.

11. A system, comprising:
    at least one memory that stores computer-executable instructions; and
    at least one processor configured to access the at least one memory, wherein the at least one processor is configured to execute the computer-executable instructions to collectively at least:
        generate a number of clusters of data points based at least in part on similarities between the data points;
        determine, based at least in part on respective data points clustered in a cluster of the clusters, a change to the cluster between iterations of generating the clusters, the change being to one or more of: a center of the cluster or a composition of the cluster;

determine that the cluster is unstable based at least in part on a determination that the change to the cluster falls outside a range, the range being based at least in part on a confidence level; and generate an adjusted number of clusters of the data points based at least in part on the cluster being unstable.

12. The system of claim 11, wherein determining that the cluster is unstable comprises:

determining a stability of the cluster based at least in part on the portion of the data points; and comparing the stability of the cluster to the confidence level.

13. The system of claim 12, wherein the data points relate to consumers, and wherein the at least one processor is further configured to execute the computer-executable instructions to collectively at least perform an action directed to one or more of the data points based at least in part on attributes of other data points within a same cluster of data points.

14. The system of claim 13, wherein the data points are defined based at least in part on at least one of income, age, political views, geographic location, or purchase history.

15. The system of claim 13, wherein the action performed is to provide advertisements that are directed at a particular cluster of the consumers.

16. The system of claim 13, wherein the attributes of other data points within the same cluster are purchases made by the consumers.

17. The system of claim 11, wherein the at least one processor is further configured to execute the computer-executable instructions to collectively at least perform an action with relation to a data point within the cluster based at least in part on prior actions performed on particular data points within the cluster.

18. One or more computer-readable media storing computer-executable instructions that, when executed by one or more computer systems, configure the one or more computer systems to perform operations comprising:

generating, in an iteration, a number of clusters based at least in part on a dataset;

determining whether respective stabilities of the clusters are above a confidence level, a cluster of the clusters determined to be unstable based at least in part on a change to a composition of the cluster between iterations of generating the clusters;

determining an adjustment to the number of clusters based at least in part one or more of the respective stabilities being below the confidence level;

generating new clusters based at least in part on the dataset and the adjustment to the number of clusters; and storing the dataset within a computer storage device based at least in part on the new clusters.

19. The one or more computer-readable media of claim 18, wherein the clusters are generated based at least in part on a k means clustering.

20. The one or more computer-readable media of claim 18, wherein the change is determined based on a comparison of the composition of the cluster from one iteration to a next iteration of cluster generation.

* * * * *